(12) United States Patent
Yang

(10) Patent No.: US 10,365,700 B2
(45) Date of Patent: Jul. 30, 2019

(54) SYSTEM AND METHOD OF MANAGING CONTEXT-AWARE RESOURCE HOTPLUG

(71) Applicant: SAMSUNG ELECTRONICS CO., LTD., Suwon-si, Gyeonggi-do (KR)

(72) Inventor: Seung-Soo Yang, Hwaseong-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 37 days.

(21) Appl. No.: 15/357,402

(22) Filed: Nov. 21, 2016

(65) Prior Publication Data
US 2017/0153921 A1    Jun. 1, 2017

(30) Foreign Application Priority Data

Nov. 27, 2015  (KR) .................. 10-2015-0167517
Aug. 19, 2016  (KR) .................. 10-2016-0105588

(51) Int. Cl.
| | | |
|---|---|---|
| G06F 1/32 | (2019.01) | |
| G06F 1/3206 | (2019.01) | |
| G06F 1/3231 | (2019.01) | |
| G06F 1/3234 | (2019.01) | |

(52) U.S. Cl.
CPC .............. *G06F 1/32* (2013.01); *G06F 1/3206* (2013.01); *G06F 1/3231* (2013.01); *G06F 1/3234* (2013.01); *Y02D 10/173* (2018.01)

(58) Field of Classification Search
None
See application file for complete search history.

(56) References Cited

U.S. PATENT DOCUMENTS

| | | | |
|---|---|---|---|
| 6,032,257 A | 2/2000 | Olarig et al. | |
| 6,535,944 B1 | 3/2003 | Johari et al. | |
| 6,901,522 B2 | 5/2005 | Buch | |
| 7,565,562 B2 | 7/2009 | Chary | |
| 8,245,057 B2 | 8/2012 | Lyu | |
| 8,621,253 B1* | 12/2013 | Brown .................... | G06F 1/324 |
| | | | 348/500 |
| 8,862,910 B2 | 10/2014 | Sato | |
| 8,977,880 B2 | 3/2015 | Chang et al. | |
| 9,619,010 B1* | 4/2017 | Marathe ................ | G06F 1/3287 |
| 2006/0294149 A1 | 12/2006 | Seshadri et al. | |
| 2008/0005599 A1* | 1/2008 | Theocharous ........ | G06F 1/3203 |
| | | | 713/300 |
| 2009/0058842 A1 | 3/2009 | Bull et al. | |
| 2013/0290758 A1* | 10/2013 | Quick ................... | G06F 1/3203 |
| | | | 713/323 |
| 2014/0365787 A1 | 12/2014 | Sagar et al. | |
| 2015/0286820 A1* | 10/2015 | Sridhara ............... | G06F 21/566 |
| | | | 726/23 |
| 2015/0355660 A1* | 12/2015 | Park ........................ | G05F 3/02 |
| | | | 327/540 |

FOREIGN PATENT DOCUMENTS

| | | |
|---|---|---|
| EP | 1171824 | 5/2003 |
| JP | 2007094470 | 4/2007 |

* cited by examiner

*Primary Examiner* — Dong U Kim
(74) *Attorney, Agent, or Firm* — F. Chau & Associates, LLC

(57) ABSTRACT

A resource hotplug managing method of a computing system includes accessing scenario data including a plurality of scenarios, evaluating the plurality of scenarios using context information about the computing system, and controlling hotplug-in or hotplug-out of a resource included in the computing system according to a satisfied scenario among the plurality of scenarios.

19 Claims, 18 Drawing Sheets

FIG. 4

| Scenario | | Primary Resource | Secondary Resource |
|---|---|---|---|
| Entering Ambient mode | idle-active | On | Off |
| | ambient | On | Off |
| | no activity | On | Off |
| Clock minute update | 12:00 | On | Off |
| | 12:01 | On | Off |
| | no activity | On | Off |
| Clock second update | 12:00:00 | On | Off |
| | 12:00:01 | On | Off |
| | 12:00:01 | On | Off |
| | 12:00:02 | On | Off |
| Audio playback | playback | On | Off |
| | next song | On | Off |
| | no activity | On | Off |
| Low priority card | no card | On | Off |
| | new card | On | Off |
| | no activity | On | Off |

FIG. 10

```
01  if (frequency > FREQ_THR) {
02      high_per = high_per + 1;
03      low_per = 0;
04  }
05  else {
06      low_per = low_per + 1;
07      high_per = 0;
08  }
```

FIG. 11

```
10  if (ambient_enter)
11      return HOTPLUG_OUT;
```
} NPSS_p

```
20  if (!display_update)
21      return HOTPLUG_OUT;
```
} NPSS_q

FIG. 13

```
30  if (low_per >= LOW_THR)
31      return HOTPLUG_OUT;
32  else if (low_per = 0)
33      if (current = HOTPLUG_OUT && hi_per < HIGH_THR)
34          return HOTPLUG_OUT;
35  else
36      if (current = HOTPLUG_OUT)
37          return HOTPLUG_OUT;
```
⎫
⎬ NPSS_r
⎭

⋮

```
40  if (hi_per >= HIGH_THR)
41      return HOTPLUG_IN;
42  else if (hi_per = 0)
43      if (current = HOTPLUG_IN && low_per < LOW_THR)
44          return HOTPLUG_IN;
45  else
46      if (current = HOTPLUG_IN)
47          return HOTPLUG_IN;
```
⎫
⎬ PSS_s
⎭

FIG. 15

```
50  if (!display_update || ambient_enter) {
51      low_per = LOW_THR + 1;
52      high_per = 0;
53      return HOTPLUG_OUT;
54  }
55  if (low_per >= LOW_THR)
56      return HOTPLUG_OUT;                           } NPSS_x
57  else if (!low_per)
58      if (current = HOTPLUG_OUT && hi_per < HI_THR)
59          return HOTPLUG_OUT;
60  else
61      if (current = HOTPLUG_OUT)
62          return HOTPLUG_OUT;
```

SYSTEM AND METHOD OF MANAGING CONTEXT-AWARE RESOURCE HOTPLUG

CROSS-REFERENCE TO RELATED APPLICATIONS

This application claims priority under 35 U.S.C. § 119 to Korean Patent Application No. 10-2015-0167517, filed on Nov. 27, 2015, and Korean Patent Application No. 10-2016-0105588, filed on Aug. 19, 2016, in the Korean Intellectual Property Office, the disclosures of which are incorporated by reference herein in their entireties.

TECHNICAL FIELD

Exemplary embodiments of the inventive concept relate to a method of managing resource hotplug, and more particularly, to a system and method of managing context-aware resource hotplug.

DISCUSSION OF RELATED ART

The computing performance of a computing system is related to power consumption. For example, a computing system that performs a large number of operations consumes a relatively large amount of power, and a computing system that performs a small number of operations consumes a relatively small amount of power. Also, a computing system that can accommodate a new component that performs a new function provides increased expandability, which consequently increases capabilities and flexibility.

SUMMARY

According to an exemplary embodiment of the inventive concept, a resource hotplug managing method of a computing system includes accessing scenario data including a plurality of scenarios, evaluating the plurality of scenarios using context information about the computing system, and controlling hotplug-in or hotplug-out of a resource included in the computing system according to a satisfied scenario among the plurality of scenarios.

According to an exemplary embodiment of the inventive concept, a computing system includes a processor, a resource capable of hotplug, and a storage device configured to store a plurality of instructions that are executed by the processor to perform a method of managing the hotplug of the resource. The method of managing the hotplug of the resource includes accessing scenario data including a plurality of scenarios, evaluating the plurality of scenarios using context information about the computing system, and controlling hotplug-in and hotplug-out of the resource according to a satisfied scenario among the plurality of scenarios.

According to an exemplary embodiment of the inventive concept, in a resource hotplug managing method of a computing system including a resource, the method includes accessing scenario data including a plurality of scenarios, evaluating a first scenario among the plurality of scenarios using context information about the computing system and controlling hotplug-in or hotplug-out of the resource if the first scenario is satisfied, accessing and evaluating remaining scenarios among the plurality of scenarios if the first scenario is not satisfied until one of the remaining scenarios is satisfied, and controlling hotplug-in or hotplug-out of the resource according to a satisfied scenario among the remaining scenarios.

BRIEF DESCRIPTION OF THE DRAWINGS

The above and other features will be more clearly understood by describing in detail with reference to the accompanying drawings.

FIG. 4 illustrates scenarios defining hotplug-in/out of resources of the computing system of FIG. 2 according to an exemplary embodiment of the inventive concept.

FIG. 10 is a diagram illustrating an operation of FIG. 9 according to an exemplary embodiment of the inventive concept.

FIG. 11 illustrates scenarios according to an exemplary embodiment of the inventive concept.

FIG. 13 illustrates scenarios according to an exemplary embodiment of the inventive concept.

FIG. 15 illustrates a scenario according to an exemplary embodiment of the inventive concept.

DETAILED DESCRIPTION OF THE EMBODIMENTS

Figure 1:
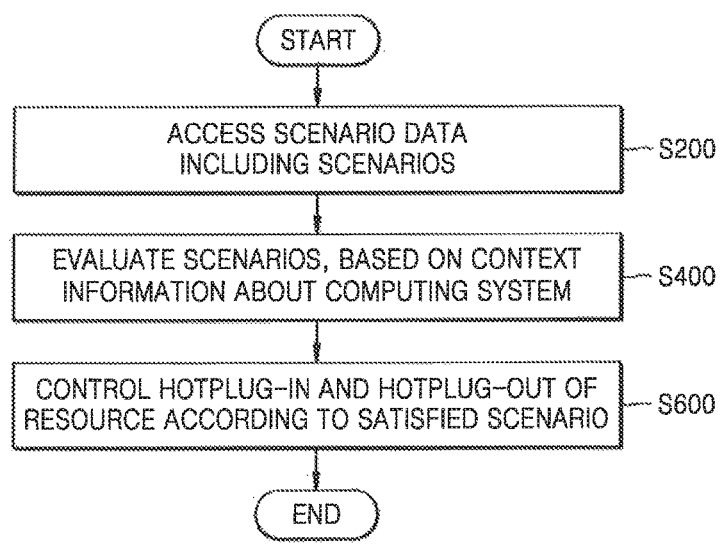
FIG. 1 is a flowchart illustrating a resource hotplug managing method according to an exemplary embodiment of the inventive concept.

Exemplary embodiments of the inventive concept will be described more fully hereinafter with reference to the accompanying drawings. Like reference numerals refer to like elements throughout the accompanying drawings.

Exemplary embodiments of the inventive concept provide a system and method of managing resource hotplug based on a context of a computing system. Accordingly, efficiency of the resource hotplug may be enhanced.

FIG. 1 is a flowchart illustrating a resource hotplug managing method according to an exemplary embodiment of the inventive concept. As illustrated in FIG. 1, a resource hotplug managing method of a computing system may include a plurality of operations S200, S400, and S600.

Hotplug (or hotplugging) may denote a function of removing or adding resources from or to a computing system while the computing system is operating. For example, when a resource of the computing system is removed while the computing system is operating, the resource may be referred to as being hotplugged out, and when a resource is added to the computing system while the computing system is operating, the resource may be referred to as being hotplugged in. Hotplug-in/out of a resource may denote that the resource is physically coupled to or removed from the computing system, or may denote that the resource is turned on or off. The resource hotplug managing method, according to an exemplary embodiment of the inventive concept, may effectively hotplug in/out resources to provide enhanced flexibility to the computing system.

Various resources of the computing system may be hotplugged in/out. For example, at least some of a plurality of processors included in the computing system may be hotplugged in/out, at least some of memory devices included in the computing system may be hotplugged in/out, and interfaces such as peripheral component interconnect (PCI) and universal serial bus (USB) may be hotplugged in/out. In addition, hotplug-in/out may be performed in one component of the computing system, and for example, at least some of a plurality of cores included in a multi-core processor may be hotplugged in/out, and at least some memory areas of a memory device may be hotplugged in/out.

Referring to FIG. 1, in operation S200, scenario data including a plurality of scenarios may be accessed. A scenario may define a context of a computing system and when the defined context occurs, the scenario may define hotplug-in or hotplug-out of a resource. According to an exemplary embodiment of the inventive concept, a resource hotplug managing method of the computing system may access the scenario data at predetermined intervals, and when a specific event occurs, the resource hotplug managing method may access the scenario data.

The context of the computing system may be defined as a set of a plurality of parameters representing a status and/or a behavior of the computing system. For example, the context of the computing system may include the status of the computing system such as a current mode of the computing system, a previous mode of the computing system, display brightness, a display mode (e.g., a low power mode, an activation mode, or a hibernation mode), whether to update the display, an operating status (e.g., an active status, a self-refresh status, or a low power status) of a memory, whether an event occurs, a type of an occurred event (e.g., an event occurring in an input device such as a touch, a key, a sensor, a camera, or a microphone, or an event based on an application such as creation, deletion, open, read, write, or request of a file), and the scenario may define a value of at least one of these parameters representing the status of the computing system. Also, according to an exemplary embodiment of the inventive concept, the status of the computing system may include a behavior that is an operation, such as occurrence of a pulse-like load, a change in display brightness, a shift of power modes of components, etc., based on the lapse of time in the computing system, and the scenario may define a value of at least one parameter representing the behavior of the computing system.

In operation S400, a plurality of scenarios may be evaluated based on context information about the computing system. A scenario may be evaluated by determining whether current context information about the computing system matches a context defined by the scenario. For example, the plurality of scenarios may be sequentially and separately evaluated, and a scenario (e.g., a satisfied scenario), which defines a context matching the current context information about the computing system, may be determined.

In operation S600, hotplug-in and hotplug-out of a resource may be controlled according to the satisfied scenario. For example, when a resource, for which hotplug-in is determined through operation S400, is in an off state currently, the resource may be hotplugged in and thus, may be changed to an on state, and when the resource is in the on state currently, the resource may be maintained in the on state. Similarly, when a resource, for which hotplug-out is determined through operation S400, is in the off state currently, the resource may be maintained in the off state, and when the resource is in the on state currently, the resource may be hotplugged out and thus, may be changed to the off state.

As described above, according to an exemplary embodiment of the inventive concept, the resource hotplug managing method may use the scenario data including the plurality of scenarios, and hotplug-in/out of a resource may be optimally determined by evaluating the plurality of scenarios based on the context of the computing system. For example, in a multi-core processor including a plurality of cores, when hotplug-in/out of a core is controlled based on only a load (e.g., an operation of a processor) processed by the multi-core processor, a core is unnecessarily hotplugged in or out. However, according to an exemplary embodiment of the inventive concept, when hotplug-in/out of a core is controlled based on the plurality of scenarios and the context of the computing system, a core is not unnecessarily hotplugged in or out. Accordingly, availability of resources of the computing system increases, and moreover, power consumption of the computing system is reduced. This will be described in further detail below.

Figure 2:
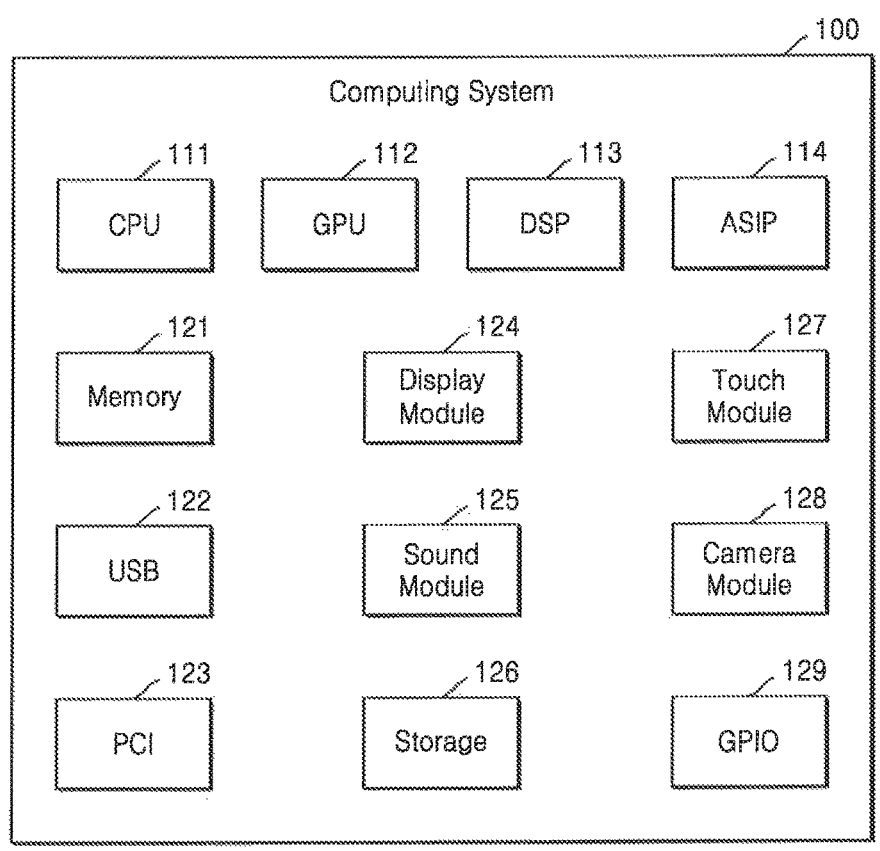
FIG. 2 is a block diagram of a computing system according to an exemplary embodiment of the inventive concept.

FIG. 2 is a block diagram of a computing system 100 according to an exemplary embodiment of the inventive concept. In detail, FIG. 2 schematically illustrates resources of the computing system 100. As illustrated in FIG. 2, the computing system 100 may include, as the resources, a central processing unit (CPU) 111, a graphics processing unit (GPU) 112, a digital signal processor (DSP) 113, an application specific instruction set processor (ASIP) 114, a memory 121, a USB 122, a PCI 123, a display module 124, a sound module 125, a storage 126, a touch module 127, a camera module 128, and a general purpose input/output (GPIO) 129. Although the resources of the computing system 100 are illustrated in FIG. 2, the inventive concept is not limited thereto. For example, the computing system 100 may include only some of the resources illustrated in FIG. 2, or may further include resources in addition to the resources illustrated in FIG. 2.

The computing system 100 may be a system that performs an operation by using the plurality of resources included therein. For example, the computing system 100 may be one of various electronic devices configuring a personal computer (PC), an ultra-mobile PC (UMPC), a workstation, a net-book, a personal digital assistant (PDA), a portable computer, a web tablet, a mobile phone, a smartphone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, or a home network, one of various electronic devices configuring a computer network, one of various electronic devices configuring a telematics network, or a radio frequency identification (RFID) device. Also, the computing system 100 may be a wearable device (or a wearable computer), e.g., an electronic device which is attached on a body of a user and capable of performing a computing operation. For example, the wearable device may be gloves, glasses, goggles, a helmet, an armband, a watch, a ring, a necklace, or the like.

The CPU 111 may be an element that controls an overall operation of the computing system 100, and may control the resources of the computing system 100. For example, the CPU 111 may execute an operating system (OS), and the OS may manage information about the resources of the computing system 100 and may control the resources based on the information about the resources. As will be described below with reference to FIG. 16, the OS may include a hotplug manager that performs the resource hotplug managing method according to an exemplary embodiment of the inventive concept, and the hotplug manager may control hotplug-in/out of the resources of the computing system 100 by using context information about the computing system 100.

Each of the GPU 112, the DSP 113, and the ASIP 114 may be a processing unit which is optimally designed for a specific purpose, and may execute dedicated instructions which are executable in its own architecture. Although the computing system 100 is illustrated as including all of the GPU 112, the DSP 113, and the ASIP 114 in FIG. 2, the computing system 100 may include only the CPU 111, or may include one or more of the GPU 112, the DSP 113, and the ASIP 114.

In an exemplary embodiment of the inventive concept, each of the CPU 111, the GPU 112, the DSP 113, and the ASIP 114 may include one or more processors capable of hotplug-in/out. For example, the CPU 111 may include a primary processor and one or more secondary processors, and the one or more secondary processors may support hotplug-in/out. Also, according to an exemplary embodiment of the inventive concept, each of the CPU 111, the GPU 112, the DSP 113, and the ASIP 114 may include a multi-core processor including a core capable of hotplug-in/out. The core may denote a processing unit for independently executing an instruction, and the multi-core processor may provide a structure for hotplug-in/out to at least one of a plurality of cores.

Figure 3A:
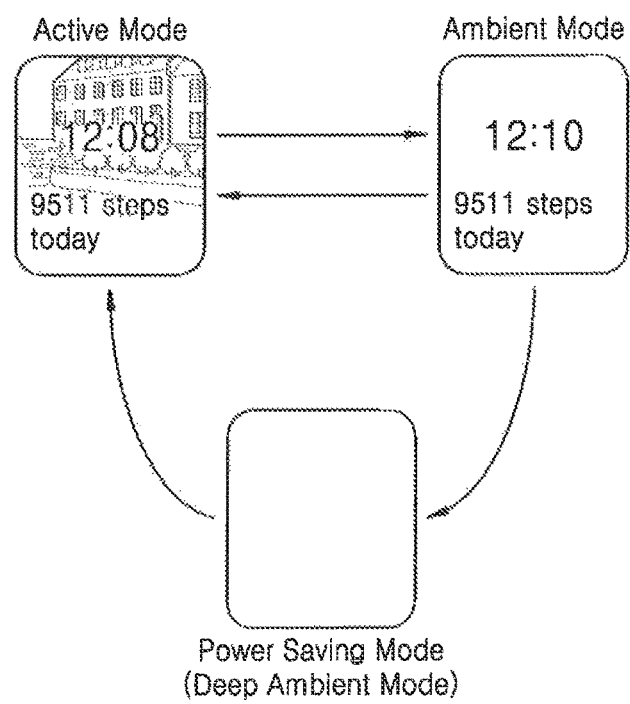
FIGS. 3A and 3B illustrate displays of the computing system based on an operation of the computing system of FIG. 2 of the inventive concept.
Figure 3B:
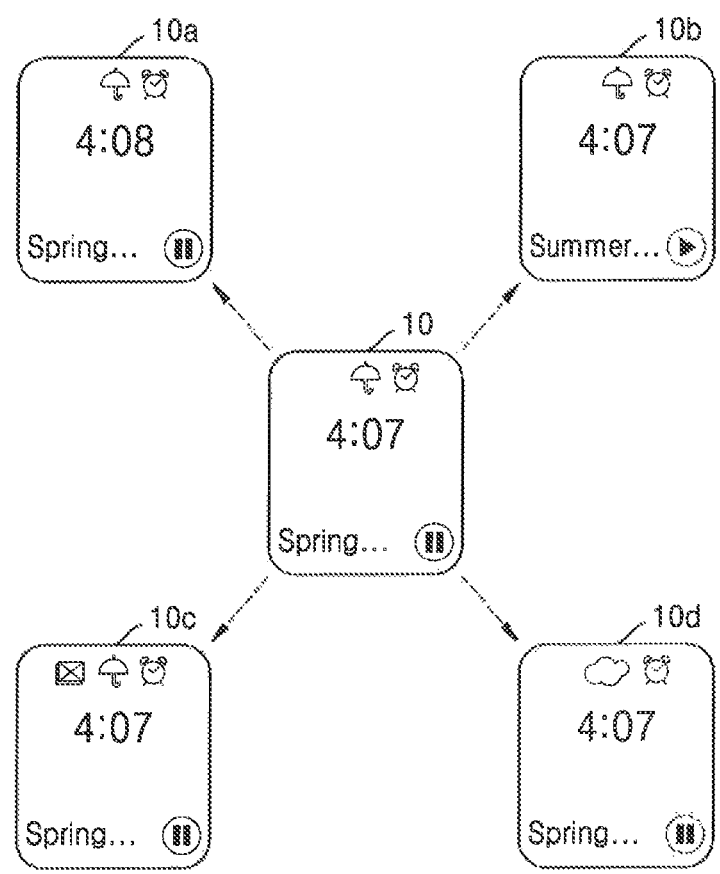

FIGS. 3A and 3B illustrate displays of the computing system 100 based on an operation of the computing system 100 of FIG. 2. In detail, FIG. 3A illustrates displays based on a mode of the computing system 100, and FIG. 3B illustrates examples where a display update occurs in the computing system 100. In FIGS. 3A and 3B, the computing system 100 is illustrated as a smartwatch (e.g., a wearable computer), but the inventive concept is not limited thereto.

Referring to FIG. 3A, the computing system 100 may support a plurality of modes. For example, as illustrated in FIG. 3A, the computing system 100 may support an active mode, an ambient mode, and a power saving mode (or a deep ambient mode) for reducing power consumption. In the active mode, the computing system 100 may execute an application in response to an interaction (e.g., a key input of a user, a touch, an orientation of the computing system, or the like) of the user, or as illustrated in FIG. 3A, the computing system 100 may display a predetermined image or video while waiting for a user input (e.g., in an idle state). When the user input is not received for a predetermined time (e.g., one minute), the computing system 100 may transition from the active mode to the ambient mode.

In the ambient mode, the computing system 100 may display only necessary information on the display. For example, as illustrated in FIG. 3A, in the ambient mode, the computing system 100 may display only a clock and exercise information (e.g., number of steps), and does not display an image or a video. Therefore, the computing system 100 consumes less power in the ambient mode than in the active mode. When an interaction of the user is sensed, the computing system 100 may transition from the ambient mode to the active mode. On the other hand, when a user input (e.g., a key input, a touch, or the like) is not received for a predetermined time (e.g., 30 minutes), the computing system 100 may transition from the ambient mode to the power saving mode.

In the power saving mode, the computing system 100 may turn off the display. For example, as illustrated in FIG. 3A, in the power saving mode, the computing system 100 may turn off the display, and thus, does not display any information. In other words, the computing system 100 may turn off the display so as to extend an operable time of the computing system 100 or minimize undesired power consumption. When an interaction (e.g., a key input of a user, a touch, an orientation or movement of the computing system, or the like) of the user occurs, the computing system 100 may transition from the power saving mode to the active mode.

When hotplug-in/out of a resource is controlled based on a load occurring in the computing system 100, undesired hotplug-in/out of the resource occurs. In other words, as illustrated in FIG. 3A, when an event that instigates a mode change of the computing system 100 occurs, the computing system 100 may hotplug in a resource which is in a hotplug-out state, or may maintain a resource, which is currently in a hotplug-in state, in the hotplug-in state, for event processing. However, hotplug-in of a resource when the computing system 100 transitions from the active mode to the ambient mode or from the ambient mode to the power saving mode causes undesired power consumption of the computing system 100.

Referring to FIG. 3B, a display 10 of the computing system 100 may be updated in response to various events. As illustrated in FIG. 3B, for example, the computing system 100 may update a display 10a for updating a clock, update a display 10b for displaying playback of a next song, update a display 10c for displaying reception of a message or a mail, or update a display 10d for displaying new weather.

Similar to the example of FIG. 3A, when hotplug-in/out of a resource is controlled based on a load occurring in the computing system 100, the computing system 100 may hotplug in a resource which is in a hotplug-out state, or may maintain a resource, which is currently in a hotplug-in state, in the hotplug-in state, for processing an event that causes one of the display updates illustrated in FIG. 3B. However, hotplug-in of a resource, occurring when a display is updated, to simply change the display causes undesired power consumption of the computing system 100.

The resource hotplug managing method, according to an exemplary embodiment of the inventive concept, prevents undesired hotplug-in of a resource in the cases described above with reference to FIGS. 3A and 3B. In other words, according to an exemplary embodiment of the inventive concept, the resource hotplug managing method may recognize a context of the computing system 100 instead of considering only a load occurring in the computing system 100, and may efficiently determine whether to hotplug in/out a resource based on the context. Accordingly, undesired hotplug-in/out of the resource may be prevented.

FIG. 4 illustrates scenarios defining hotplug-in/out of resources of the computing system 100 of FIG. 2 according to an exemplary embodiment of the inventive concept. As described above with reference to FIG. 1, scenario data may include a plurality of scenarios, and each of the scenarios may define a context of the computing system 100 and may define hotplug-in/out of a resource when the defined context occurs. In FIG. 4, a hotplugged-in resource may be expressed as on, and a hotplugged-out resource may be expressed as off. As illustrated in FIG. 4, a primary resource may always be in an on state, and a secondary resource may be hotplugged in/out according to the scenario.

As indicated by the shaded portions in FIG. 4, the resource hotplug managing method, according to an exemplary embodiment of the inventive concept, prevents a secondary resource from being unnecessarily hotplugged in. For example, as illustrated in FIG. 4, when the computing system 100 transitions from the active mode to the ambient mode according to an "Entering Ambient mode" scenario, when a minute display is changed according to a "Clock minute update" scenario, when a second display is changed according to a "Clock second update" scenario, and when playback of a next song begins according to an "Audio playback" scenario, the secondary resource may be maintained in an off state without being hotplugged in.

Moreover, as illustrated in FIG. 4, when a "Low priority card" scenario occurs, the secondary resource may be maintained in the off state without being hotplugged in. A card may denote a sheet of content that functions as an entry point for more detailed information. The card may be displayed on a display and may include a photograph, a letter, a link, and/or the like. The card may have a priority based on significance of the information which the card represents. For example, a card corresponding to information such as a promise reminder or reception of one new e-mail may have a relatively high priority, and a card corresponding to weather information or continuous reception of new e-mails may have a relatively low priority. When the computing system 100 is in the ambient mode, a high-priority card may be displayed after the computing system 100 is changed to the active mode, and a low-priority card may be displayed in the ambient mode. According to an exemplary embodiment of the inventive concept, frequency of card occurrence may be previously estimated through simulation or measurement, and a scenario defining hotplug-in/out of a resource based on card occurrence may be defined using a result of the estimation.

Figure 5A:
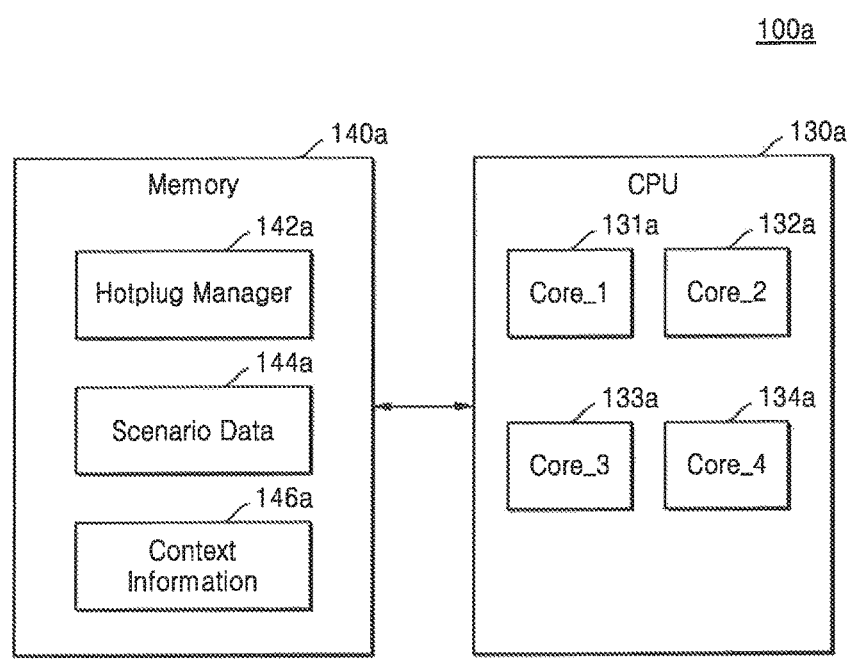
FIGS. 5A and 5B illustrate computing systems performing a resource hotplug managing method according to exemplary embodiments of the inventive concept.
Figure 5B:
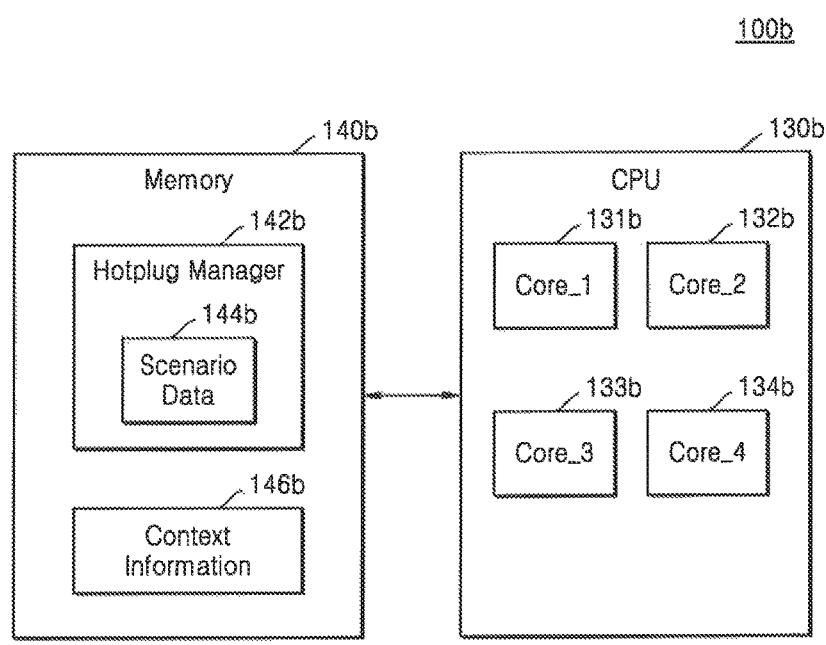

FIGS. 5A and 5B illustrate computing systems performing a resource hotplug managing method according to exemplary embodiments of the inventive concept. As illustrated in FIGS. 5A and 5B, a computing system 100a (100b) may include a CPU 130a (130b) and a memory 140a (140b) which are connected to each other to enable communication therebetween. Hereinafter, descriptions of FIG. 5B that are repetitive of descriptions of FIG. 5A will be omitted.

Referring to FIG. 5A, the CPU 130a may include a plurality of cores 131a to 134a as a multi-core processor. Although the CPU 130a including four cores 131a to 134a in FIG. 5A, the CPU 130a may include less than four or more than four cores. The memory 140a may include (or store) a hotplug manager 142a, scenario data 144a, and context information 146a. The memory 140a may be an element storing data and may include a volatile memory device, such as static random access memory (SRAM) or dynamic random access memory (DRAM), or a nonvolatile memory device, such as read-only memory (ROM), electrically erasable and programmable ROM (EEPROM), or flash memory, but the inventive concept is not limited thereto. For example, the memory 140a may include the same kind or different kinds of two or more memory devices, and at least two of the hotplug manager 142a, the scenario data 144a, and the context information 146a may be stored in different memory devices.

According to an exemplary embodiment of the inventive concept, the resource hotplug managing method may be performed by the CPU 130a executing the hotplug manager 142a stored in the memory 140a. The hotplug manager 142a may include a plurality of instructions executable by the CPU 130a, and the CPU 130a may execute the instructions included in the hotplug manager 142a to perform the resource hotplug managing method (e.g., illustrated in FIG. 1). For example, the first core 131a of the four cores 131a to 134a of the CPU 130a may be a primary core and may be in the on state while the computing system 100a is operating. The first core 131a may execute the hotplug manager 142a stored in the memory 140a. Second to fourth cores 132a to 134a of the CPU 130a may be secondary cores and may be hotplugged in/out by the hotplug manager 142a (e.g., by the primary core 131a executing the hotplug manager 142a).

As described above with reference to FIG. 1, the scenario data 144a may include a plurality of scenarios, and the hotplug manager 142a may access the scenario data 144a periodically or according to a request of another procedure. Additionally, the context information 146a may include a plurality of parameters representing a context of the computing system 100a, and the hotplug manager 142a may refer to the parameters included in the context information 146a for evaluating the scenarios included in the scenario data 144a. Furthermore, as will be described below with reference to FIG. 9, the hotplug manager 142a may generate a parameter representing a behavior of the computing system 100a based on some of the parameters included in the context information 146a.

Referring to FIG. 5B, according to an exemplary embodiment of the inventive concept, the hotplug manager 142b may include the scenario data 144b. As described above, in FIG. 5A, the hotplug manager 142a may access the scenario data 144a periodically or according to a request of another procedure. However, in comparison, in FIG. 5B, the hotplug manager 144b may be periodically called or may be executed according to a call of another procedure, and when the hotplug manager 144b is executed, the scenario data 144b included in the hotplug manager 144b may be accessed.

Figure 6:
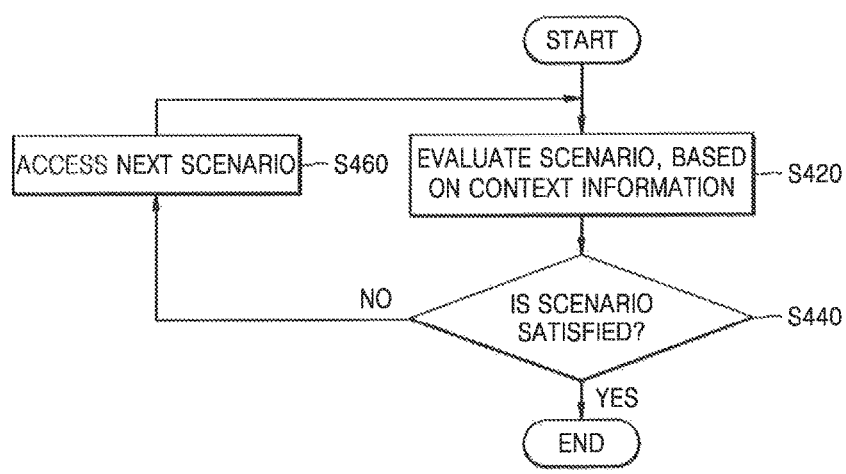
FIG. 6 is a flowchart illustrating an operation of FIG. 1 according to an exemplary embodiment of the inventive concept.

FIG. 6 is a flowchart illustrating operation S400 of FIG. 1 according to an exemplary embodiment of the inventive concept. As described above with reference to FIG. 1, in operation S400, a plurality of scenarios are evaluated based on context information about the computing system. Hereinafter, FIG. 6 will be described with reference to the computing system 100a of FIG. 5A.

Referring to FIG. 6, in operation S420, a scenario may be evaluated based on context information. For example, the scenario may define a context of the computing system 100a by defining values of one or more parameters, and the hotplug manager 142a may refer to the one or more parameters, which are defined by the scenario, from the context information 146a. To evaluate the scenario, the hotplug manager 142a may determine whether values of one or more parameters representing a current context of the computing system 100a match the values defined by the scenario. Examples of evaluating scenarios will be described below with reference to FIGS. 11 to 14.

In operation S440, it is determined whether the scenario is satisfied. When the scenario evaluated in operation S420 is satisfied, operation S400 of FIG. 1 may end. On the other hand, when the scenario evaluated in operation S420 is not satisfied, a next scenario may be accessed in operation S460. In other words, an operation (e.g., operation S420) of evaluating the plurality of scenarios may be repeated until a satisfied scenario is obtained.

Figure 7:
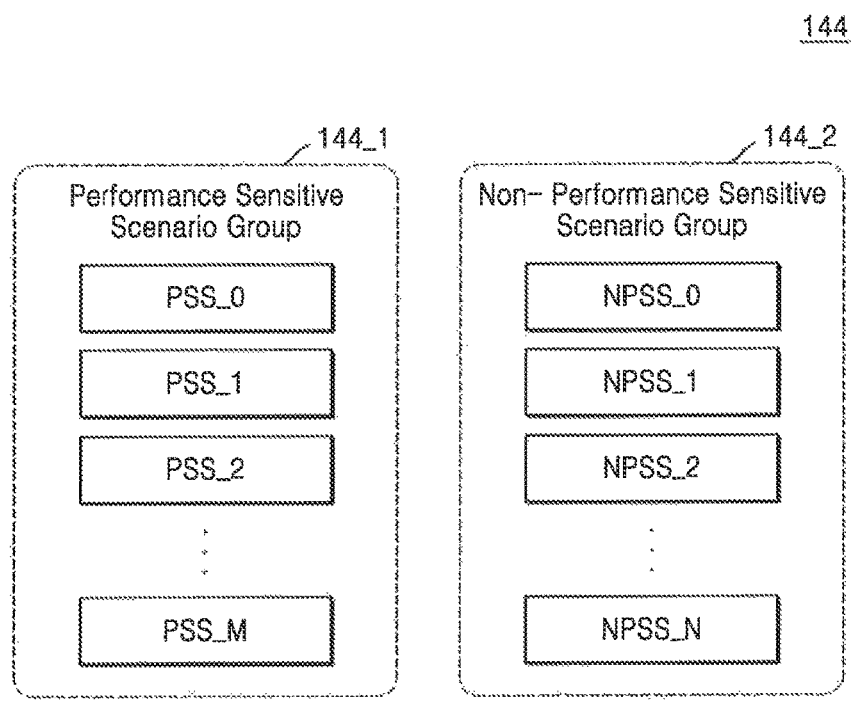
FIG. 7 is a diagram illustrating scenario data according to an exemplary embodiment of the inventive concept.

FIG. 7 is a diagram illustrating scenario data 144 according to an exemplary embodiment of the inventive concept. As illustrated in FIG. 7, the scenario data 144 may include a performance sensitive scenario group 144_1 and a non-performance sensitive scenario group 144_2. Hereinafter, FIG. 7 will be described with reference to the computing system 100a of FIG. 5A.

The performance sensitive scenario group 144_1 may include scenarios PSS_0 to PSS_M which define a context requiring high computing performance of the computing system 100a. In other words, when satisfied, each of the scenarios PSS_0 to PSS_M included in the performance sensitive scenario group 144_1 may define hotplug-in of a resource. Additionally, the non-performance sensitive scenario group 144_2 may include scenarios NPSS_0 to NPSS_N defining a context where high computing performance of the computing system 100a is not required. In other words, when satisfied, each of the scenarios NPSS_0 to NPSS_N included in the non-performance sensitive scenario group 144_2 may define hotplug-out of a resource. Detailed examples of the scenarios included in the performance sensitive scenario group 144_1 and the scenarios included in the non-performance sensitive scenario group 144_2 will be described below with reference to FIGS. 11 to 13.

Figure 8:
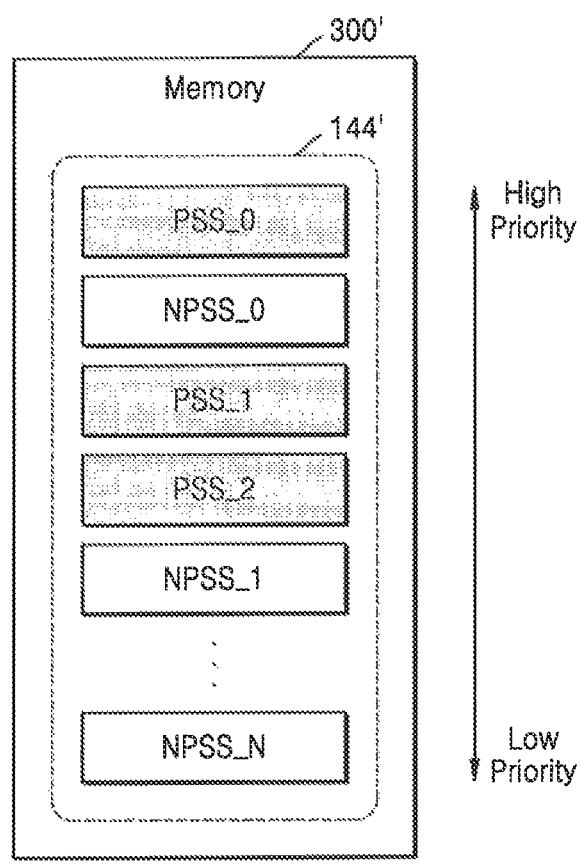
FIG. 8 is a diagram illustrating scenario data stored in a memory according to an exemplary embodiment of the inventive concept.

FIG. 8 is a diagram illustrating scenario data stored in a memory 300' according to an exemplary embodiment of the inventive concept. As described above with reference to FIG. 6, each of a plurality of scenarios included in scenario data 144' may be evaluated based on context information until a satisfied scenario is obtained.

In the scenario data 144' according to an exemplary embodiment of the inventive concept, the plurality of scenarios may be sorted according to priorities. For example, as illustrated in FIG. 8, the plurality of scenarios PSS_0, PSS_1, and PSS_2 included in the performance sensitive scenario group 144_1 of FIG. 7 and the plurality of scenarios NPSS_0, NPSS_1, and NPSS_N included in the non-performance sensitive scenario group 144_2 of FIG. 7 may be sorted according to priorities. An operation of evaluating scenarios in FIG. 1 (e.g., operation S400) may sequentially evaluate the plurality of scenarios, and thus, a scenario having a relatively high priority may be evaluated first, and a scenario having a relatively low priority may be evaluated later.

Figure 9:
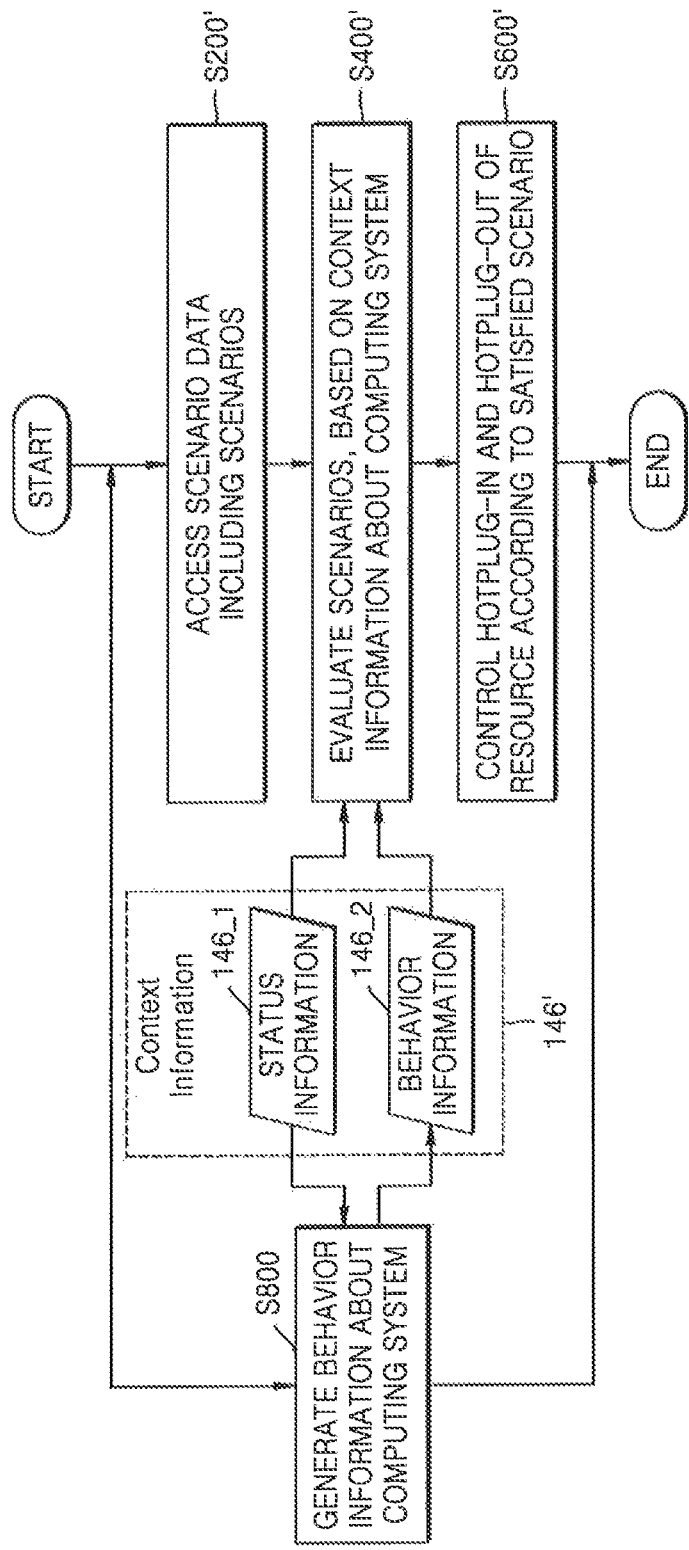
FIG. 9 is a flowchart illustrating a resource hotplug managing method according to an exemplary embodiment of the inventive concept.

FIG. 9 is a flowchart illustrating a resource hotplug managing method according to an exemplary embodiment of the inventive concept. As illustrated in FIG. 9, a resource hotplug managing method of a computing system may include a plurality of operations S200', S400', and S600', and in comparison with the example of FIG. 1, may further include operation S800. Operations S200', S400', and S600' of FIG. 9 may be the same as or similar to operations S200, S400, and S600 of FIG. 1.

In operation S800, behavior information about the computing system may be generated. As illustrated in FIG. 9, context information 146' representing a context of the computing system may include status information 146_1 and behavior information 146_2, and the behavior information 146_2 may represent a context of an operation over a period of time in the computing system. For example, some of a plurality of scenarios may define, as a context of the computing system, a change over a period of time in a value of a first parameter included in the status information 146_1 of the computing system, and thus, in operation S800, a second parameter representing the change in the first parameter may be generated as the behavior information 146_2 based on the status information 146_1. An example of operation S800 will be described below with reference to FIG. 10.

FIG. 10 is a diagram illustrating operation S800 of FIG. 9 according to an exemplary embodiment of the inventive concept. In detail, FIG. 10 illustrates an example of operation S800 with pseudo code. As described above with reference to FIG. 9, behavior information of a computing system may be generated in operation S800.

In FIG. 10, a parameter 'frequency' may have an operating frequency of a CPU (e.g., the CPU 130a of FIG. 5A) as its value, a parameter 'high_per' may represent a period for which the CPU stays at a high operating frequency, and a parameter 'low_per' may represent a period for which the CPU stays at a low operating frequency. The operating frequency of the CPU being high may denote that a load on the CPU (e.g., from an operation processed by the CPU) is high. For example, the parameter 'frequency' may represent a current operating frequency of the CPU and may be one of the parameters included in the status information 146_1 of FIG. 9. The parameter 'high_per' and the parameter 'low_per' may be generated from the parameter 'frequency' and may each be one of the parameters included in the behavior information 146_2 of FIG. 9.

Referring to lines 1 to 4 of FIG. 10, when the operating frequency of the CPU is higher than a predetermined threshold value 'FREQ_THR', the parameter 'high_per' may increase, but the parameter 'low_per' may be reset (e.g., set to 0). Similarly, referring to lines 5 to 8 of FIG. 10, when the operating frequency of the CPU is less than or equal to the predetermined threshold value 'FREQ_THR', the parameter 'low_per' may increase, but the parameter 'high_per' may be reset (e.g., set to 0). Therefore, the value of the parameter 'high_per' may represent a time for which the CPU stays at a high operating frequency (e.g., a frequency higher than the threshold value 'FREQ_THR'), and the value of the parameter 'low_per' may represent a time for which the CPU stays at a low operating frequency (e.g., a frequency less than or equal to the threshold value 'FREQ_THR'). As will be described below with reference to FIGS. 13 and 14, the parameters 'high_per' and 'low_per', included in the behavior information 146_1, may be used to generate a pulse-like load.

Figure 12:
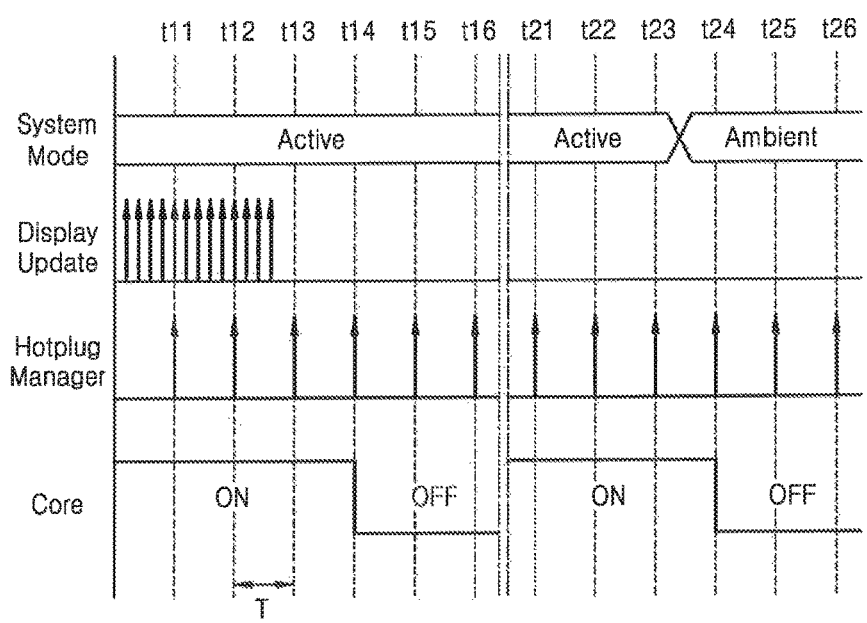
FIG. 12 illustrates an example where hotplug-in/out of a central processing unit (CPU) core is controlled using the scenarios of FIG. 11 over a period of time according to an exemplary embodiment of the inventive concept.

FIG. 11 illustrates scenarios according to an exemplary embodiment of the inventive concept, and FIG. 12 illustrates an example where hotplug-in/out of a central processing unit (CPU) core is controlled using the scenarios of FIG. 11 over a period of a time according to an exemplary embodiment of the inventive concept. Referring to FIG. 11, scenarios NPSS_p and NPSS_q may be included in the non-performance sensitive scenario group 144_2 of FIG. 7, and when satisfied, may each define hotplug-out of a core.

According to the scenario NPSS_p, when the computing system enters the ambient mode (as indicated by a parameter 'ambient_enter'), 'HOTPLUG_OUT', which defines that the core is hotplugged out, may be returned. Similarly, according to the scenario NPSS_q, when a parameter 'display_update' representing occurrence of display update is not activated, 'HOTPLUG_OUT' may be returned. In other words, the scenario NPSS_q may define that the core is hotplugged out when display update does not occur for a certain period.

Referring to FIG. 12, a hotplug manager (e.g., the hotplug manager 142a of FIG. 5A), performing a resource hotplug managing method according to an exemplary embodiment of the inventive concept, may be executed every period T. The hotplug manager may evaluate a plurality of scenarios every period T based on context information about the computing system, thus controlling hotplug-in/out of the core. However, the inventive concept is not limited thereto. For example, unlike FIG. 12, when a specific event occurs, the hotplug manager may be executed according to a call of a procedure.

At t11 to t13, the computing system may be in the active mode, and a display may be frequently updated. Therefore, at t11 to t13, the core may be in the on state. At t14, the hotplug manager may evaluate a plurality of scenarios, and since the display is not updated at t13 to t14, the scenario NPSS_q of FIG. 11 may be satisfied. Accordingly, the hotplug manager may hotplug out the core, and the core may be shifted from the on state to the off state.

At t23 to t24, the computing system may transition from the active mode to the ambient mode. At t24, the hotplug manager may evaluate the plurality of scenarios, and since the computing system enters the ambient mode, the scenario NPSS_p of FIG. 11 may be satisfied. Accordingly, the hotplug manager may hotplug out the core, and the core may be shifted from the on state to the off state.

Figure 14:
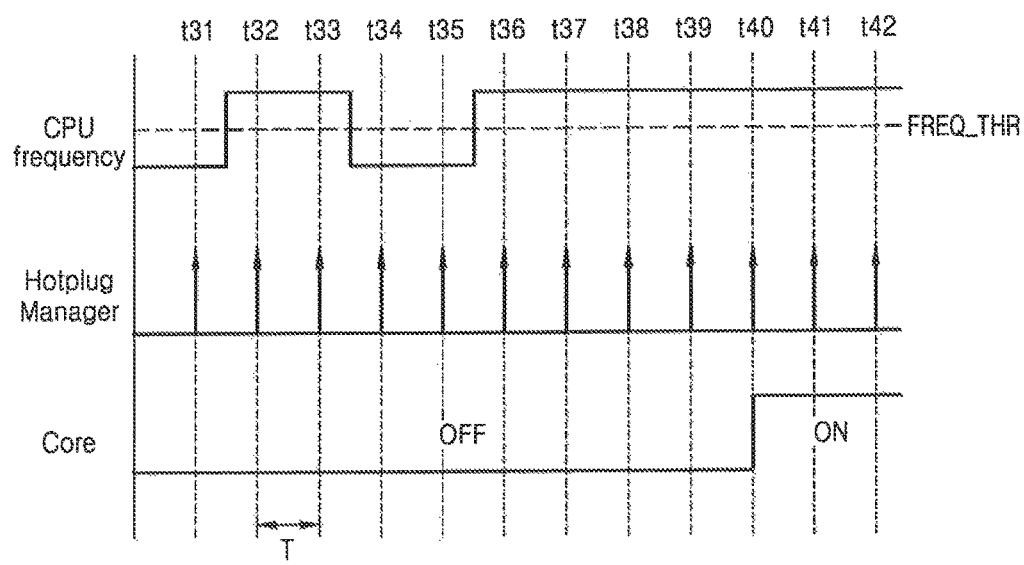
FIG. 14 illustrates an example where hotplug-in/out of a CPU core is controlled using the scenarios of FIG. 13 over a period of time according to an exemplary embodiment of the inventive concept.

FIG. 13 illustrates scenarios according to an exemplary embodiment of the inventive concept, and FIG. 14 illustrates an example where hotplug-in/out of a CPU core is controlled using the scenarios of FIG. 13 over a period of time according to an exemplary embodiment of the inventive concept. Referring to FIG. 13, a scenario NPSS_r may be included in the non-performance sensitive scenario group 144_2 of FIG. 7 (e.g., when satisfied, 'HOTPLUG_OUT' is returned), and a scenario PSS_s may be included in the performance sensitive scenario group 144_1 of FIG. 7 (e.g., when satisfied, 'HOTPLUG_IN' returns).

According to the scenario NPSS_r, at lines 30 and 31, when the parameter 'low_per' is greater than or equal to a threshold value 'LOW_THR', 'HOTPLUG_OUT' may be returned. In other words, instead of hotplugging out the core immediately when the operating frequency of the CPU is lowered, the core may be hotplugged out when the operating frequency of the CPU is lowered for a predetermined time or more, thus preventing undesired hotplug-out of the core caused by a temporary change in a load.

At lines 32 to 34, if the parameter 'low_per' is 0, the core is in a hotplugged-out or off state (e.g., 'current=HOTPLUG_OUT') currently, and the parameter 'high_per' is less than a threshold value 'HIGH_THR', 'HOTPLUG_OUT' may be returned. In other words, instead of hotplugging in the core immediately when the core is in the off state currently and the operating frequency of the CPU increases, the core may be hotplugged out (e.g., may be maintained in the off state) when a period where the operating frequency of the CPU is high is less than a predetermined period, thus preventing undesired hotplug-in of the core caused by a temporary change in a load.

At lines 35 to 37, when the core is in a hotplugged-out or off state currently, 'HOTPLUG_OUT' may be returned. In other words, in a case where the context of the computing system does not satisfy the preceding conditions of the scenario NPSS_r and the core is in the off state currently, the core may be maintained in the off state.

According to the scenario PSS_s, at lines 40 and 41, when a parameter 'hi_per' is greater than or equal to the threshold value 'HIGH_THR', 'HOTPLUG_OUT' may be returned. In other words, instead of hotplugging in the core immediately when the operating frequency of the CPU increases, the core may be hotplugged in when the operating frequency of the CPU is high for a predetermined period or longer, thus preventing undesired hotplug-in of the core caused by a temporary change in a load.

At lines 42 to 44, if the parameter 'high_per' is 0, the core is in a hotplugged-in or on state (e.g., 'current=HOTPLUG_IN') currently, and the parameter 'low_per' is less than the threshold value 'LOW_THR', 'HOTPLUG_IN' may be returned. In other words, instead of hotplugging out the core immediately when the core is in the on state currently and the operating frequency of the CPU is lowered, the core may be hotplugged in (e.g., may be maintained in the on state) when a period where the operating frequency of the CPU is low is less than a predetermined period, thus preventing undesired hotplug-out of the core caused by a temporary change in a load.

At lines 45 to 47, when the core is in a hotplugged-in or on state currently, 'HOTPLUG_IN' may be returned. In other words, when the context of the computing system does not satisfy the preceding conditions of the scenario PSS_s and the core is in the on state currently, the core may be maintained in the on state.

Referring to FIG. 14, similar to the example of FIG. 12, the hotplug manager may be executed every period T and may evaluate a plurality of scenarios based on context information about the computing system, thus controlling hotplug-in/out of the core. In the example of FIG. 14, it is assumed that the threshold value 'HIGH_THR' of FIG. 13 is 5.

At t32 and t33, the operating frequency of the CPU may be higher than the threshold value 'FREQ_THR'. At t32 and t33, the hotplug manager may evaluate a plurality of scenarios, and since the parameter 'hi_per' is 1 at t32 and is 2 at t33, the scenario NPSS_r of FIG. 13 is satisfied (hi_per<HIGH_THR at line 33). Therefore, the hotplug manager may hotplug out the core, and the core may be maintained in the off state. As a result, despite the pulse-like load which occurs from t31 to t34, undesired hotplug-in of the core is prevented.

At t36 to t40, the operating frequency of the CPU may be higher than the threshold value 'FREQ_THR'. Therefore, since the parameter 'hi_per' is 5 at t40, the scenario NPSS_r of FIG. 13 is not satisfied, and the scenario PSS_s of FIG. 13 is satisfied (hi_per>=HIGH_THR at line 40). Accordingly, the hotplug manager may hotplug in the core, and the core may be shifted from the off state to the on state at t40.

FIG. 15 illustrates a scenario according to an exemplary embodiment of the inventive concept. In detail, FIG. 15 illustrates a scenario defining a plurality of parameters representing a context of a computing system. For example, as illustrated in FIG. 15, two or more of the scenarios NPSS_p, NPSS_q, NPSS_r, and PSS_s of FIGS. 11 and 13 (e.g., NPSS_p, NPSS_q and NPSS_r) may correspond to one scenario NPSS_x.

According to an exemplary embodiment of the inventive concept, a scenario may set parameters representing a behavior of the computing system. For example, at lines 51 and 52 of FIG. 15, the parameter 'low_per' may be set greater than the threshold value 'LOW_THR', and the parameter 'high_per' may be reset. In other words, when the display update is not performed or the computing system enters the ambient mode and thus a core is hotplugged out (at line 53 of FIG. 15), the parameter 'low_per', representing a period where the operating frequency of the CPU is low, may be set greater than the threshold value 'LOW_THR', and the parameter 'high_per', representing a period where the operating frequency of the CPU is high, may be reset. As such, a context of the computing system, such as the period where the operating frequency of the CPU is low (e.g., 'low_per'), may be generated or updated for subsequent operations of evaluating scenarios by the hotplug manager.

Figure 16:
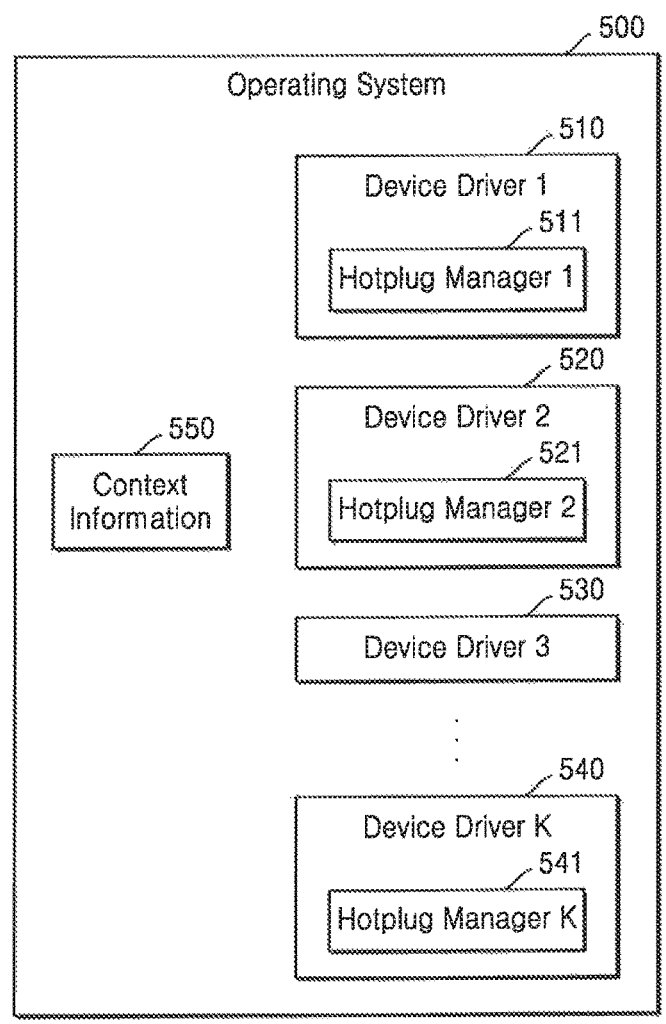
FIG. 16 illustrates a software module performing a resource hotplug managing method according to an exemplary embodiment of the inventive concept.

FIG. 16 illustrates a software module performing a resource hotplug managing method according to an exemplary embodiment of the inventive concept. As described above with reference to FIGS. 5A and 5B, the resource hotplug managing method, according to an exemplary embodiment of the inventive concept, may be performed by a hotplug manager. As illustrated in FIG. 16, a plurality of hotplug managers 511, 521, and 541 may be included in an OS 500 of a computing system.

The software module illustrated in FIG. 16 may be stored in a computer-readable storage device. For example, the storage device storing the software module of FIG. 16 may include a volatile memory device, such as a double data rate synchronous dynamic random access memory (DDR SDRAM) device, a dynamic random access memory (DRAM) device, a static random access memory (SRAM) device, or a mobile DRAM device, and/or a nonvolatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, or a ferroelectric random access memory (FRAM) device. According to an exemplary embodiment of the inventive concept, the storage device may further include a solid state drive (SSD), a hard disk drive (HDD), and/or a CD-ROM.

According to an exemplary embodiment of the inventive concept, a hotplug manager may be provided for each resource which is to be hotplugged. As illustrated in FIG. 16, the OS 500 may include a plurality of device drivers 510, 520, 530, and 540 for controlling resources (e.g., a CPU, a GPU, a memory, a PCI, a USB, etc.) of the computing system. The device drivers 510, 520, and 540 of the resources, which support hotplug-in/out, may include the hotplug managers 511, 521, and 541, respectively.

As illustrated in FIG. 16, the OS 500 may include context information 550 representing a context of the computing system, and the hotplug managers 511, 521, and 541, included in the device drivers 510, 520, and 540, respectively, may access the context information 550 to evaluate a plurality of scenarios based on the context of the computing system. For example, a first hotplug manager 511 may access the context information 550 and may evaluate a plurality of scenarios based on a parameter included in the context information 550. The first hotplug manager 511 may control hotplug-in/out of a resource/device (e.g., a PCI) controlled by a first device driver 510 according to a satisfied scenario.

While the inventive concept has been shown and described with reference to the exemplary embodiments thereof, it will be understood by those of ordinary skill in the art that various changes in form and details may be made thereto without departing from the spirit and scope of the present inventive concept as defined by the following claims.

What is claimed is:

1. A resource hotplug managing method of a computing system comprising:
   accessing scenario data comprising a plurality of scenarios;
   evaluating the plurality of scenarios using context information about the computing system; and
   controlling hotplug-in or hotplug-out of a resource included in the computing system according to a satisfied scenario among the plurality of scenarios,
   wherein the context information about the computing system comprises at least one of status information about the computing system or behavior information representing a behavior of the computing system,
   the behavior is an operation of the computing system over a period of time, and
   the plurality of scenarios are sequentially and separately evaluated to determine the satisfied scenario.

2. The resource hotplug managing method of claim 1, wherein the scenario data comprises:
   a performance sensitive scenario group comprising a scenario which defines hotplug-in of a resource when satisfied; and
   a non-performance sensitive scenario group comprising a scenario which defines hotplug-out of a resource when satisfied.

3. The resource hotplug managing method of claim 2, wherein the non-performance sensitive scenario group comprises a scenario defining at least one of a minute update of a clock, an audio playback display update, and a low priority card update in an ambient mode.

4. The resource hotplug managing method of claim 2, wherein the non-performance sensitive scenario group comprises a scenario defining at least one of a second update of a clock and an ambient mode entry from an active mode.

5. The resource hotplug managing method of claim 1, wherein
   the plurality of scenarios are sorted according to priorities within the scenario data, and
   evaluating the plurality of scenarios comprises sequentially evaluating the plurality of scenarios in accordance with the priorities.

6. The resource hotplug managing method of claim 1, wherein
   the computing system comprises a processor with a plurality of cores, and
   controlling the hotplug-in or hotplug-out comprises controlling hotplug-in and hotplug-out of at least one of the plurality of cores.

7. The resource hotplug managing method of claim 6, wherein the scenario data comprises a scenario defining hotplug-out of at least one of the plurality of cores when the computing system is in an ambient mode.

8. The resource hotplug managing method of claim 6, wherein the scenario data comprises a scenario defining hotplug-in or hotplug-out of at least one of the plurality of cores, while the computing system is in an active mode, according to a length of a first period where operating frequencies of hotplugged-in cores among the plurality of cores are greater than a threshold value or a length of a second period where the operating frequencies of the hotplugged-in cores are less than or equal to the threshold value.

9. The resource hotplug managing method of claim 1, wherein
the context information about the computing system comprises both the status information and the behavior information, and
the resource hotplug managing method further comprises generating the behavior information using the status information.

10. The resource hotplug managing method of claim 1, wherein the computing system is a wearable device.

11. A computing system comprising:
a multi-core processor comprising a plurality of cores, wherein at least a first core among the plurality of cores is capable of hotplug; and
a storage device configured to store a plurality of instructions that are executed by the processor to perform a method of managing the hotplug of the first core,
wherein the method of managing the hotplug of the first core comprises:
accessing scenario data comprising a plurality of scenarios;
evaluating the plurality of scenarios using context information about the computing system; and
controlling hotplug-in and hotplug-out of the first core according to a satisfied scenario among the plurality of scenarios.

12. The computing system of claim 11, wherein the scenario data comprises:
a performance sensitive scenario group comprising a scenario which defines hotplug-in of a first core when satisfied; and
a non-performance sensitive scenario group comprising a scenario which defines hotplug-out of a first core when satisfied.

13. The computing system of claim 12, wherein the non-performance sensitive scenario group comprises:
a scenario evaluating at least one of a minute update of a clock, an audio playback display update, and a low priority card update in an ambient mode; and
a scenario evaluating at least one of a second update of the clock and an ambient mode entry from an active mode.

14. The computing system of claim 11, wherein
the context information about the computing system comprises status information about the computing system and behavior information representing a behavior of the computing system,
the behavior is an operation of the computing system over a period of time, and
the method of managing the hotplug of the first core further comprises generating the behavior information using the status information.

15. The computing system of claim 11, wherein the computing system is a wearable device.

16. A resource hotplug managing method of a computing system comprising a resource, the method comprising:
accessing scenario data including a plurality of scenarios;
evaluating a first scenario among the plurality of scenarios using context information about the computing system and controlling hotplug-in or hotplug-out of the resource if the first scenario is satisfied;
accessing and evaluating remaining scenarios among the plurality of scenarios if the first scenario is not satisfied until one of the remaining scenarios is satisfied; and
controlling hotplug-in or hotplug-out of the resource according to a satisfied scenario among the remaining scenarios,
wherein the context information comprises status information about the computing system and behavior information representing a behavior of the computing system,
the behavior is an operation of the computing system over a period of time,
the computing systsem has an operating frequency, and
evaluating the first scenario and controlling hotplug-in or hotplug-out of the resource further comprises:
determining a first check whether the computing system has a low operating frequency period greater than or equal to a first predetermined threshold period, wherein the low operating frequency period is a period when the operating frequency is less than predetermined threshold frequency; and
performing hotplug-out of the resource if the first check is passed.

17. The resource hotplug managing method of claim 16, wherein the computing system has an active mode and an ambient mode, and evaluating the first scenario and controlling hotplug-in or hotplug-out of the resource further comprises:
determining whether the computing system enters the ambient mode from the active mode; and
performing hotplug-out of the resource if the computing system enters the ambient mode from the active mode.

18. The resource hotplug managing method of claim 16, wherein the computing system further comprises a display, and evaluating the first scenario and controlling hotplug-in or hotplug-out of the resource further comprises:
determining whether the display has not been updated over a predetermined period; and
performing hotplug-out of the resource if the display has not been updated over the predetermined period.

19. The resource hotplug managing method of claim 16, wherein evaluating the first scenario and controlling hotplug-in or hotplug-out of the resource further comprises:
determining a second check whether a parameter representing the low operating frequency period is reset, the computing system is currently in a hotplug-out state, and a high operating frequency period is less than a second predetermined threshold period, wherein the high operating frequency period is a period when the operating frequency is greater than the predetermined threshold frequency; and
performing hotplug-out of the resource if the second check is passed.

* * * * *